Patented Oct. 18, 1932

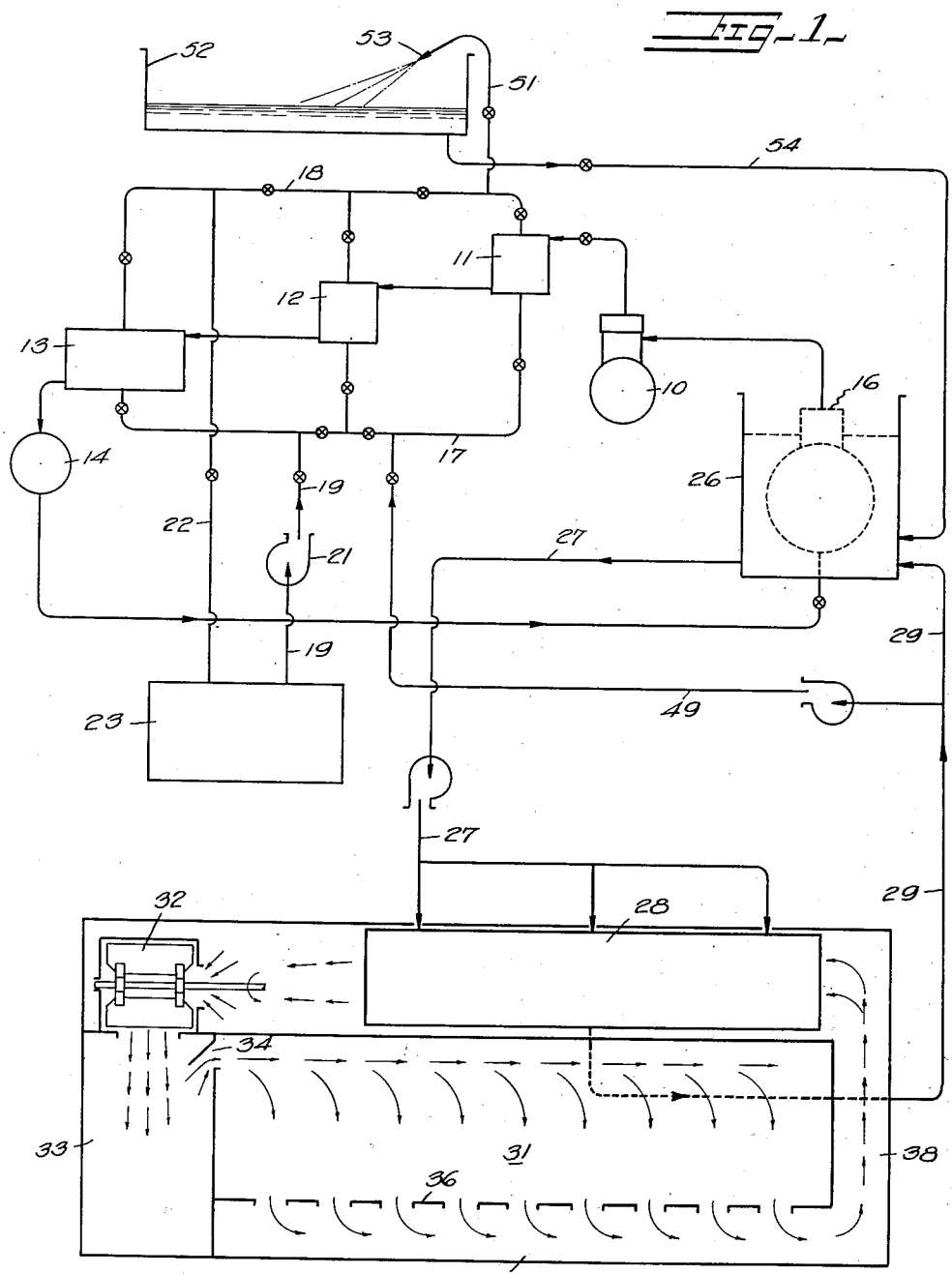

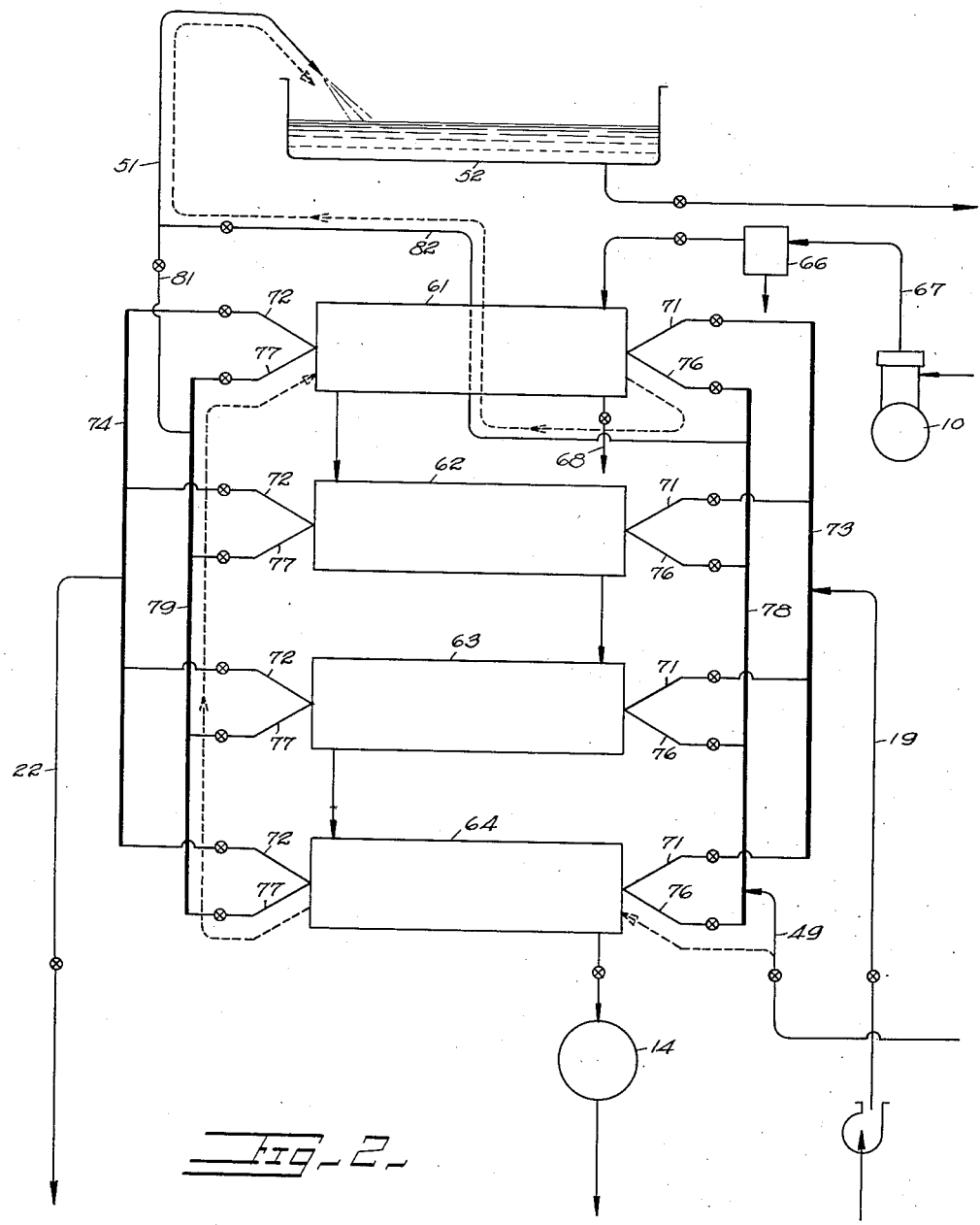

1,882,969

UNITED STATES PATENT OFFICE

PAUL A. SCHERER, OF MEDFORD, OREGON, AND GRAHAME B. RIDLEY, OF SAN FRANCISCO, CALIFORNIA, ASSIGNORS TO SOUTHERN OREGON SALES INC., OF MEDFORD, OREGON, A CORPORATION OF OREGON

REFRIGERATING SYSTEM AND METHOD

Application filed June 24, 1930. Serial No. 463,543.

This invention relates generally to systems and methods for the maintenance of refrigeration temperatures, such as are employed for the storage and preservation of fruit and other perishable products.

In refrigerating systems of the above character it is common to utilize a chamber or storage space within which products are placed, and to cool the air within the chamber by contacting the same with cold brine solution. The brine solution is passed thru a circulation cycle in which it is contacted with a heat absorber or heat exchanger of a refrigerating apparatus for removal of heat. When the refrigerating or storage chamber of prior systems contain fruit, vegetables, or other similar products containing moisture, a considerable amount of the moisture content is picked up by the air and in turn absorbed by the brine solution, thus tending to continually decrease the brine concentration. To prevent the brine from becoming too dilute, it has therefore been necessary to add concentrated brine from time to time. It is also characteristic of prior systems utilizing a closed brine circulating cycle, that the system as a whole tends to become polluted with odors from the products being stored or refrigerated, thus requiring occasional cleansing of the apparatus, as by replacement of the brine solution and by flushing out the refrigerating chamber or storage compartment with fresh air. It is evident that such cleansing methods not only add considerably to maintenance and operating expenses, but may interfere with continued operation of the system.

It is therefore an object of the present invention to devise a system and method of the above character which will tend to maintain concentration of the brine solution substantially constant.

It is a further object of the invention to devise a system and method of the above character which will be self-cleansing in so far as odors are concerned, and which will therefore make possible operation at relatively high efficiency and with a minimum of maintenance expense.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Figure 1 is a diagrammatic view illustrating a system incorporating the present invention.

Fig. 2 is a diagrammatic view illustrating a modified portion of the system of Fig. 1.

The system as illustrated in the drawings utilizes certain apparatus which is conventional in systems of this character. Thus for the refrigerating apparatus I have indicated a suitable compressor 10, serving to compress a suitable fluid refrigerant such as ammonia or ethyl chloride, and which delivers the compressed refrigerant to the heat exchangers 11, 12 and 13. In passing thru these heat exchangers the fluid refrigerant is cooled and condensed, and collected in the receiver 14. From the receiver 14 the condensed fluid refrigerant is delivered to heat exchanger or absorber 16, and the vapors from this heat exchanger are delivered back to the intake of compressor 10. For circulating a cooling medium such as water thru one or more of the heat exchangers 11, 12 and 13, we have indicated pipe connections 17 and 18, these pipe connections having valves for controlling flow of water to the individual exchangers, and being in turn connected to a source of cold water thru the pipe connection 19 and pump 21. After passing thru one or more of the heat exchangers 11, 12 or 13, the heated water can be discharged thru pipe connection 22, and if it is to be reused, it is cooled and returned to pipe 19 from source 23.

The brine recirculation cycle can be established by a brine tank 26 within which heat exchanger 16 is disposed. Brine is removed from this tank thru pipe 27, and delivered to a suitable heat exchanger or absorber 28. From the heat exchanger 28 the brine is returned thru pipe 29, to the brine tank 26, where it is again cooled by the heat exchanger 16. Heat exchanger 28 is preferably of the type in which the cooled brine solution is brought into direct contact with the air or other medium to be cooled. For example it may consist of a number of sheets of cloth kept saturated by the cold brine, thru which the air to be cooled is circulated. This heat exchanger 28 is shown associated with a suitable compartment 31 for the storage of products to be refrigerated. For circulating air thru this compartment and in contact with heat exchanger 28, we have indicated suitable means such as a blower 32 serving to discharge cold air downwardly into passage 33, from which it is discharged laterally and across the upper portion of storage compartment 31, thru opening 34. Air from the compartment is withdrawn downwardly thru the perforated floor 36, and is delivered thru passages 37 and 38, into contact with heat exchanger 28, and then returned to the intake of blower 32.

In addition to the system as described above, we preferably utilize means for diverting a portion of the brine solution from the recirculation cycle, and for reconditioning the same prior to its reintroduction into the system. Thus we have shown a valve control pipe 49 serving to communicate between the brine recirculation apparatus, as for example with pipe 29, and also connected with one or more of the heat exchangers 11, 12 or 13, by way of pipe 17. Another pipe 51 is shown connected with pipe 18, and this latter pipe serves to deliver diverted brine solution to a suitable receiver or storage reservoir 52, which is preferably exposed to the atmosphere. More effective contact between the atmosphere and the diverted brine solution can be had by discharging this solution from pipe 51 thru a suitable spray nozzle 53. From receiver 52, the diverted brine solution can be returned to the brine recirculating apparatus, thru pipe 54.

The operation of the above described system can be explained as follows:—With the refrigerating apparatus in operation, brine within tank 26 will be cooled, and cold brine will be delivered to the heat exchanger 28. Air circulated into contact with the heat exchanger 28 will therefore be cooled to a relatively low temperature, thus refrigerating products placed within storage compartment 31. Assuming that the products placed within the compartment 31 contain considerable moisture, as for example vegetables or fruits, a certain amount of this moisture will be absorbed by the circulating air. The brine solution will in turn take up this moisture from the air which is brought into direct contact with the same, so that in time the brine solution will become more dilute. In order to tend to maintain the concentration of the brine solution substantially constant, and in order to secure other results to be presently explained, a certain amount of the brine is diverted from the brine recirculation cycle thru pipe 49, and delivered to spray nozzle 53 thru one or more of the heat exchangers 11, 12 or 13. For example the valves associated with pipes 16 and 19 can be controlled so that the main liquid cooling system represented by source 23 serves to deliver cooling water only to heat exchangers 12 and 13, while heat exchanger 11 is cooled by the diverted brine solution from pipe 49. Thus in passing thru exchanger 11 the diverted brine solution absorbs considerable heat from the compressed fluid refrigerant delivered from compressor 10, so that after leaving exchanger 11 and upon being discharged thru spray nozzle 53, the brine solution is at a sufficiently elevated temperature that a substantial percentage of its water content is taken up by the surrounding atmosphere as water vapor. Generally the brine is permitted to stand in receiver 52 for an appreciable period, after which it can be returned to the brine recirculation cycle thru pipe 54.

While the diversion of brine thru pipe 49 and delivery of the same to receiver 52 at an elevated temperature can take place continuously, it is apparent that the solution from receiver 52 can be reintroduced back into the cycle either continuously or in batches. Furthermore it is also apparent that the diversion of brine solution thru pipes 49 can occur intermittently or in batches, rather than continuously. The temperature at which the diverted brine solution is delivered to receiver 52 need not be within close limits, since a material percentage of water vapor will be evolved from the solution between wide temperature limits. In general however it may be noted that the temperature with which the brine solution is delivered to receiver 52, is dependent upon the rate with which the brine solution is diverted, and the amount of heat absorbed from the compressed fluid refrigerant. This diverted solution can be heated to a higher temperature by passing the same thru both heat exchangers 11 and 12, upon proper control of the valves associated with pipes 13 and 19. In this event the cooling liquid from source 23 is of course passed thru only the remaining heat exchanger 13.

As has been previously explained the invention also affords a method of preventing contamination or pollution of the system.

Assuming that products such as fruit are stored within compartment 31, the odors from the fruit are taken up by the circulated air, and in turn absorbed by the brine solution. Reconditioning of a portion of the brine solution, either intermittently or continuously serves as a means for removing such absorbed odors from the system. This removal is effected not only by exposure of the brine solution to the atmosphere in receiver 52, but also by the fact that the diverted brine portion is heated before its exposure to the atmosphere thus causing the absorbed odors to be evolved from the exposed brine solution more effectively. Thus in certain instances the reconditioning of the brine solution according to our method may be utilized principally for cleansing the system of odors, or in other systems in which contamination by odors is not a dominant factor, the reconditioning can be principally for the purpose of offsetting the tendency of the brine solution to become more dilute. It is also apparent that in many instances the reconditioning can be both for the purpose of offsetting tendency of the brine solution to become more dilute, and for cleansing the system of odors.

It is evident that the system and method described above can be modified in various ways. For example while the diversion of brine solution thru one or more of the heat exchangers of the refrigerating apparatus is a novel and economical expedient, it is apparent that the brine solution can be otherwise reconditioned, as for example by heating it from an external source and then exposing it to the atmosphere.

While in the claims we have referred specifically to a brine solution, it is to be understood that the invention can be utilized with other solutions capable of giving results substantially equivalent to that of brine.

It is evident that various modified forms of heat exchange means, represented by exchangers 11, 12 and 13, can be employed. For example in Fig. 2 we have shown a modified form of heat exchange means formed by the exchangers 61, 62, 63 and 64. A suitable oil separator 66 has been shown inserted in the pipe connection 67, between compressor 10 and the first exchanger 61. Oil vapor carried over by the compressed refrigerant and which is not separated and removed by separator 66, is condensed in the first exchanger 61, and can be removed thru pipe 68. For circulating either diverted brine or cold water thru the exchangers, each exchanger is shown provided with valve controlled branch pipes 71 and 72, which connect with header pipes 73 and 74. Other valve controlled pipes 76 and 77 communicate with header pipes 78 and 79. Cooling water can be introduced into header pipe 73 thru pipe 19, and after circulating thru one or more of the exchangers, can be removed from header 74 thru pipe 22. Diverted brine solution can be introduced into header pipe 78 thru pipe 49, and can be removed from header pipe 79 or pipe 78 thru either of the valve controlled pipes 81 and 82, and pipe 51, to be delivered to the reservoir or receiver 52. Fluid refrigerant delivered to the first exchanger 61 is passed thru the exchangers in series and finally delivered to the receiver 14.

With the arrangement shown in Fig. 2 the valves in the various branch pipes can be controlled so that cooling water introduced thru pipe 19 is circulated thru exchangers 62, 63 and 64 to the exclusion of exchanger 61. Diverted brine solution can then be circulated thru exchanger 61, to the exclusion of the cooling water. If it is desired to absorb a greater amount of heat by the diverted brine, the diverted brine can be passed thru two or more of the exchangers as for example exchangers 61 and 62, leaving only the exchangers 63 and 64 to be cooled by water. The preferred mode of operation is to first pass the brine solution thru the exchanger 64 and then thru the exchanger 61, as indicated by dotted lines in Fig. 2. This mode of operation has certain advantages in that it aids in reducing the capacity and the horse power consumption of the sytsem as a whole, due to the thermal recovery effected in exchanger 64. It is evident that the arrangement of Fig. 2 has great flexibility of control as any one of the exchangers can be cooled with either diverted brine solution or water.

We claim:

1. A method of preventing pollution of brine in a refrigerating system, characterized by the use of a medium to be cooled, means for recirculating brine into contact with said medium, and refrigerating means for removing heat from said brine, said method comprising diverting a portion of said brine from said recirculating means, heating said diverted brine, exposing the heated brine to the atmosphere, and returning said brine portion to said recirculating means.

2. In a system of the character described, a refrigeration space containing a medium to be cooled, brine recirculating means adapted to bring cool brine into heat absorbing contact with said medium, means for diverting a portion of said brine from said recirculating means and for returning the same to said means, means for heating said diverted brine portion out of contact with the atmosphere and means for subjecting the diverted portion to the atmosphere to evaporate undesired moisture prior to its return to said recirculating means.

3. In a system of the character described, a refrigeration space containing a medium to be cooled, brine recirculating means adapted to bring cool brine into heat absorbing contact with said medium, refrigerating apparatus for cooling said brine, said apparatus including a refrigerating cycle in which a compressed fluid refrigerant is passed thru a heat exchanger for removal of heat from the same, means for diverting a portion of said brine thru said heat exchanger for heating the same, means for exposing the diverted brine portion to the atmosphere, and means for returning the brine portion thus treated to the recirculating means.

In testimony whereof, I have hereunto set my hand.

GRAHAME B. RIDLEY.

In testimony whereof, I have hereunto set my hand on the 27th day of May, 1930.

PAUL A. SCHERER.